United States Patent

Goldsmith

[15] 3,688,374
[45] Sept. 5, 1972

[54] METHOD OF MAKING AN INTEGRAL PINION AND INNER BEARING RACE FOR RACK AND PINION ASSEMBLY

[72] Inventor: Ronald Goldsmith, Hitchin, England

[73] Assignee: Cam Gears Limited, Hitchin, England

[22] Filed: Oct. 23, 1970

[21] Appl. No.: 83,344

Related U.S. Application Data

[62] Division of Ser. No. 839,420, July 7, 1969, abandoned.

[52] U.S. Cl. .................................29/159.2, 74/498
[51] Int. Cl. .........B21d 53/28, B21h 5/00, B21r 1/30, B23p 15/14, B29d 15/00
[58] Field of Search .......29/159.2; 74/498, 496, 422, 74/500

[56] References Cited

UNITED STATES PATENTS

| 1,474,516 | 11/1923 | Eicher | 72/374 |
| 1,998,108 | 4/1935 | Walsher | 29/159.2 X |
| 2,464,658 | 3/1949 | Stivin | 219/154 |
| 3,346,937 | 10/1967 | Folkerts | 29/159.2 |
| 3,362,059 | 1/1968 | DiPonio et al. | 29/407 X |
| 3,362,248 | 1/1968 | Meyers | 74/500 |
| 3,421,387 | 1/1969 | Adams | 74/498 |
| 3,531,976 | 10/1970 | Fuhrman | 29/159.2 X |

FOREIGN PATENTS OR APPLICATIONS

| 699,856 | 12/1964 | Canada | 74/498 |

Primary Examiner—John F. Campbell
Assistant Examiner—Victor A. DiPalma
Attorney—Hill, Sherman, Meroni, Gross & Simpson

[57] ABSTRACT

A method of making a forged integral pinion and bearing seat member, especially suited for rack and pinion steering gear assemblies, which has a cylindrical body with longitudinally spaced radially projecting flanges or collars, gear teeth between the flanges, and bearing raceways adjacent the outboard sides of the flanges. The one-piece member eliminates the necessity for inner bearing rings, and the gear teeth are conveniently formed by a die rolling operation, with the dies sinking into the cylindrical body portion between the flanges for about one-half of the tooth depth to displace metal outwardly to form the tips of the teeth.

2 Claims, 5 Drawing Figures

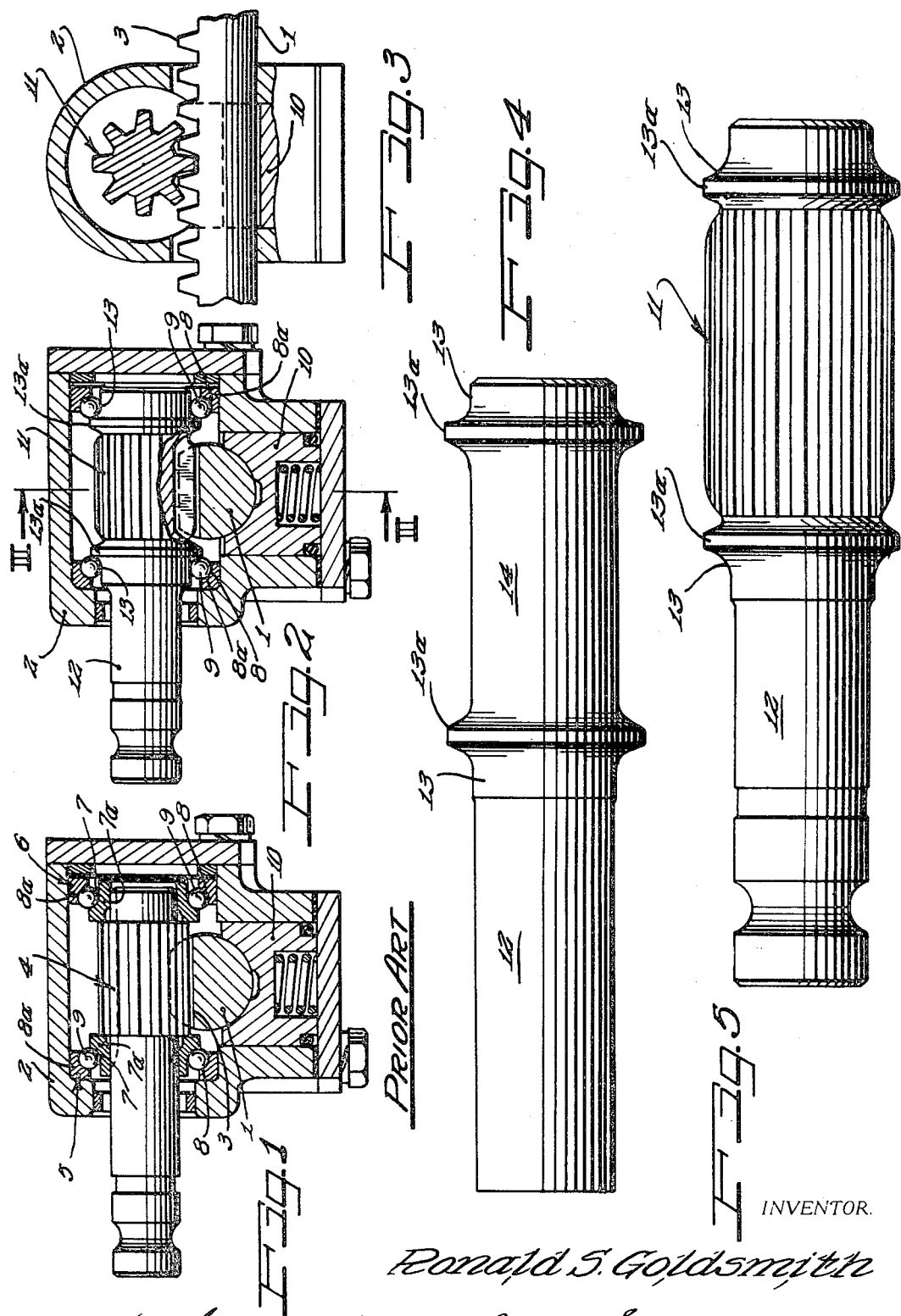

METHOD OF MAKING AN INTEGRAL PINION AND INNER BEARING RACE FOR RACK AND PINION ASSEMBLY

This case is a divisional application of Ronald S. Goldsmith application for patent entitled "INTEGRAL PINION AND INNER BEARING RACE FOR RACK AND PINION ASSEMBLY," Ser. No. 839,420, filed July 7, 1969, and now abandoned.

BACKGROUND OF THE INVENTION

1. Field of the Invention

This invention pertains to methods of making pinion structures, and particularly pinions which have their own bearing raceways and are useful in rack and pinion devices of the type incorporated in steering gear assemblies.

2. Description of the Prior Art

Pinions for rack and pinion steering gear have been heretofore rotatably mounted in a pair of axially spaced anti-friction bearings, each of which comprises an inner race carried by the pinion and an outer race carried by the pinion housing. An example of such a rack and pinion device is shown in the prior art in the Frederick John Adams U.S. Pat. No. 3,421,387, granted Jan. 14, 1969. The pinion teeth of such prior art devices were produced by machine cutting requiring a cutter run-out extending beyond the effective length of the teeth, requiring careful alignment and seating of the inner bearing race rings on the pinion after the cutting operation.

SUMMARY OF THE INVENTION

The present invention now eliminates the requirement for separate bearing raceways to rotatably mount a pinion and provides die-formed pinion teeth between radial flanges which will straddle the rack bar. The pinion is thus a one-piece member, inexpensively formed and providing its own raceways for anti-friction bearing elements.

While the invention will be hereinafter specifically described as embodied in a method of making a rack and pinion assembly for automotive steering gear, it will be understood that the principles of this invention are generally applicable to pinions for any usage.

It is then an object of this invention to provide a method of making a one-piece pinion and bearing raceway.

Other objects, features and advantages of this invention will be readily apparent from the following description of the preferred embodiment thereof, taken in conjunction with the accompanying drawing, although variations and modifications may be effected without departing from the spirit and scope of the novel concepts of the disclosure.

BRIEF DESCRIPTION OF THE DRAWINGS

FIG. 1 is a longitudinal cross-sectional view with parts, in elevation, of a prior art rack and pinion device for a steering gear;

FIG. 2 is a view similar to FIG. 1, but illustrating the rack and pinion device with the pinion and integral bearing seats made by the method of this invention;

FIG. 3 is a fragmentary transverse cross-sectional view taken along the line III—III of FIG. 2;

FIG. 4 is an enlarged elevational view of a forged blank from which the integral pinion and bearing seatings of this invention are formed;

FIG. 5 is a view similar to FIG. 4, but illustrating the finished integral pinion and bearing seats.

DESCRIPTION OF THE PREFERRED EMBODIMENTS

In FIG. 1 the rack and pinion device includes a rack bar 1 which is adapted to move through a housing 2. The rack bar 1 is provided with a rack 3 the teeth of which engage with the teeth of a pinion 4. The pinion 4 is rotatably mounted in bearings shown generally at 5 and 6 in the housing 2 so that during rotation thereof the rack bar 1 moves through the housing. The bearing assemblies 5 and 6 are axially spaced and located adjacent each end of the pinion teeth so that axial restraining forces are applied by the bearing assemblies on the pinion 4 which forces are directed from one bearing assembly towards the other. As shown, each of the bearing assemblies comprises an inner race seating 7 of annular form which is provided on an annular bearing member 7a secured to, and co-axial with, the pinion 4, an opposed outer race seating 8 of annular form which is provided on a bearing member 8a which is co-axial with the pinion 4 and is carried by the housing 2 and a plurality of balls 9 which are retained between the opposed seating surfaces 7 and 8 and movable around the annular track formed by the seating surfaces. The manner in which the pinion 4 is rotatably mounted in FIG. 1 is well known in the art but to provide a complete construction for a rack and pinion device, the rack 1 is shown slidably supported on a carrier member 10. The carrier member 10 abuts the rack bar 1 on the side thereof remote from its rack 3 and is slidably mounted in the housing 2 and spring-loaded relative to the housing to provide support for the rack bar and to bias the teeth of the rack into engagement with the teeth of the pinion.

It will be apparent that the necessity for manufacturing and securing the bearing members 7a for the inner race seatings 7 to the pinion adds considerably to cost.

The teeth of the pinion 4 in FIG. 1 are usually produced by a hobbing or tooth-generating operation, both of which require a cutter run-out which extends beyond the effective axial length of the teeth, as shown in dotted lines. Consequently, the bearing members 7a and 8a have to be applied and secured to the pinion after the teeth-cutting operation is completed, or otherwise they would be damaged by the cutting process.

According to the present invention there is provided a method of making an integral metal pinion and inner race seatings for mounting in ball or roller bearings which comprises a pinion having radially flanged co-axial inner race seatings at each end of, and adjacent, the teeth of the pinion, the flanges being of larger diameter than the diameter between the roots of the pinion teeth. If required the flanges can abut the ends of the pinion teeth. Conveniently the mean diameter of the inner race seatings is approximately equal to the diameter of the pinion teeth.

By the present invention the integral flanges are located adjacent the pinion teeth and consequently the teeth cannot be formed by a normal cutting operation since this would result in damage to the flanges. While a construction can be envisaged in which the flanges are axially spaced from the ends of the pinion teeth to provide sufficient clearance to permit over-run from the ends of the teeth during the cutting operation without damage to the flanges, such a construction would necessitate a pinion of considerably increased length which would in turn increase the size of the pinion housing (as for example in a rack and pinion device) with a resultant increase in bulk and cost.

A According to the present invention there is provided a method of making an integral pinion and inner race seatings which includes forming a pinion blank having a cylindrical part the axial length of which is to correspond to the axial length of the toothed section of the pinion to be made and having radially flanged, co-axial inner race seatings located at each end of, and adjacent the cylindrical part, the flanges being of larger diameter than the diameter between the roots of the teeth of the pinion to be made and subjecting the cylindrical part of the pinion blank to a rolling operation between toothed dies which are applied thereto under pressure to form teeth in the cylindrical which extend for substantially the axial length of the cylindrical part. Preferably the diameter of the cylindrical part of the pinion blank is approximately equal to the mean diameter between the roots and tips of the teeth of the pinion which is to be made and the rolling operation is controlled so that the teeth of the dies sink into the cylindrical part of the pinion blank for approximately half their depth of tooth and the material thus displaced is forced outwards to fill the cavities at the roots of the teeth of the dies to form the outer portions (or tips) of the teeth on the pinion.

By the method of the present invention the axial length of the teeth on the pinion as formed from the pinion blank can be very closely controlled and any run-out (if at all present at the ends of the pinion teeth) is negligible.

In the rack and pinion device of FIGS. 2 and 3, parts identical with parts shown in FIG. 1 have been marked with the same reference numerals, and perform the same functions as in the prior art device of FIG. 1. However, as shown in FIGS. 2 and 3, the integral pinion and inner race seatings unit of this invention comprises a pinion 11, co-axially from which extends a shaft 12.

Integrally formed and co-axial with the metal pinion 11 and shaft 12 are a pair of axially spaced, radially flanged, inner race seatings 13 which are located one at, and adjacent, each end of the axial length of the pinion teeth. The race seatings 13 are intended for mounting in ball or roller bearings. The diameter of the flanges 13a for the inner race seatings is larger than the diameter between the roots of the teeth in the pinion 11 and, in the present example, the diameter of the flanges 13a, is larger than the diameter of the teeth of the pinion 11. Conveniently the main diameter of the inner race seatings 13 is approximately equal to the diameter of the teeth in the pinion 11.

The teeth of the pinion 11 in FIGS. 2 and 3 are formed by subjecting a forged metal pinion blank shown in FIG. 4 to a rolling operation. The pinion blank is integrally formed to include the shaft 12, the pair of axially spaced inner race seatings 13 having the radially extending flanges 13a and a cylindrical part 14 the axial length of which substantially corresponds to the axial length of the teeth to be formed in the pinion 11. The diameter of the cylindrical part 14 is approximately equal to the mean diameter between the roots and the tips of the teeth in the pinion 11.

The cylindrical part 14 of the pinion blank is subjected to a rolling operation between toothed dies the teeth of which sink under pressure into the cylindrical part. The pressure of the dies is so arranged that their teeth sink into the cylindrical part 14 for half their depth and the material displaced by the teeth of the dies is forced outwards into the cavities at the root of the teeth of the dies and the displaced material forms the outer portion of the teeth in the pinion 11.

After the rolling operation the pinion can be cleaned up in known manner and any additional machining performed.

What I claim is:

1. The method of making an integral pinion and bearing seat member for rack and pinion steering gear assemblies which has bearing seat flanges of larger diameter than the diameter between the roots of the pinion teeth and has the pinion teeth extending closely adjacent the flanges which comprises forging a metal pinion blank with axially separated flanges, an axially elongated cylindrical portion between said flanges of less diameter than the flanges and diverging at the ends thereof to the peripheries of the flanges, inner ball race bearing seatings converging from the outboard ends of the flanges to cylindrical portions and a cylindrical shaft of smaller diameter than said cylindrical seatings extending axially from one seating, subJecting the cylindrical part of the blank between the flanges to a rolling pressing operation between tooth dies forming axial teeth in the cylindrical part extending for the axial length thereof to the divergent ends thereof, and controlling the diameter of the elongated cylindrical portion and the flanges so the diameter between the roots of the teeth will be smaller than the diameter of the flanges.

2. The method of claim 1 wherein the diameter of the elongated cylindrical portion is controlled to a diameter approximately equal to the mean diameter between the roots and tips of the teeth and the rolling pressure is controlled to sink the teeth of the dies into said cylindrical portion about half the depth of the die teeth.

* * * * *